(12) United States Patent
Masumura et al.

(10) Patent No.: US 12,057,105 B2
(45) Date of Patent: Aug. 6, 2024

(54) SPEECH RECOGNITION DEVICE, SPEECH RECOGNITION METHOD, AND PROGRAM

(71) Applicant: NIPPON TELEGRAPH AND TELEPHONE CORPORATION, Tokyo (JP)

(72) Inventors: Ryo Masumura, Tokyo (JP); Tomohiro Tanaka, Tokyo (JP); Takanobu Oba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 344 days.

(21) Appl. No.: 17/428,959

(22) PCT Filed: Jan. 27, 2020

(86) PCT No.: PCT/JP2020/002648
§ 371 (c)(1),
(2) Date: Aug. 5, 2021

(87) PCT Pub. No.: WO2020/162238
PCT Pub. Date: Aug. 13, 2020

(65) Prior Publication Data
US 2022/0139374 A1 May 5, 2022

(30) Foreign Application Priority Data
Feb. 7, 2019 (JP) ................. 2019-020396

(51) Int. Cl.
*G10L 15/06* (2013.01)
*G10L 15/14* (2006.01)
*G10L 15/18* (2013.01)

(52) U.S. Cl.
CPC ............ *G10L 15/063* (2013.01); *G10L 15/14* (2013.01); *G10L 15/1815* (2013.01)

(58) Field of Classification Search
CPC ......... G10L 15/16; G10L 15/22; G10L 15/26; G10L 15/02; G10L 15/183
See application file for complete search history.

(56) References Cited

U.S. PATENT DOCUMENTS 11,043,214 B1 * 6/2021 Hedayatnia ............ G06N 20/10
2006/0195321 A1 * 8/2006 Deligne .................. G10L 15/18
704/E15.009

(Continued)

OTHER PUBLICATIONS

Chorowski et al. (2014) "End-to-end Continuous Speech Recognition using Attention-based Recurrent NN: First Results" NIPS: Workshop Deep Learning and Representation Learning Workshop, Dec. 8, 2014.

(Continued)

*Primary Examiner* — Mark Villena (57) ABSTRACT

Provided is a speech recognition device capable of implementing end-to-end speech recognition considering a context. The speech recognition device includes a model parameter learning unit that learns a model parameter θ by using a word sequence of concern as an observation value and using a word sequence previous to the word sequence of concern, an acoustic feature value sequence corresponding to the word sequence of concern, and the model parameter θ as parameters to perform maximum likelihood estimation for a likelihood function of a probability that the observation value occurs under the parameters and an uttered speech recognition unit that repeats, in order of time sequence, processing of recognizing a word sequence to be recognized, the processing of recognizing the word sequence to be recognized being performed by using the word sequence to be recognized as an observation value and using an already recognized word sequence previous to the word sequence to be recognized, an acoustic feature value sequence corresponding to the word sequence to be recognized, and the (Continued)

learned model parameter θ as parameters and based on a maximum likelihood criterion for the likelihood function of the probability that the observation value occurs under the parameters.

18 Claims, 4 Drawing Sheets

(56) References Cited

U.S. PATENT DOCUMENTS

| | | | | |
|---|---|---|---|---|
| 2011/0307241 | A1* | 12/2011 | Waibel | G06F 40/44 |
| | | | | 704/2 |
| 2017/0148433 | A1* | 5/2017 | Catanzaro | G10L 25/18 |
| 2019/0139540 | A1* | 5/2019 | Kanda | G10L 15/19 |

OTHER PUBLICATIONS

Chorowski et al. (2015) "Attention-Based Models for Speech Recognition" Advances in Neural Information Processing Systems (NIPS), Dec. 7, 2015, pp. 577-585.

* cited by examiner

SPEECH RECOGNITION DEVICE, SPEECH RECOGNITION METHOD, AND PROGRAM

CROSS-REFERENCE TO RELATED APPLICATIONS

This application is a U.S. 371 Application of International Patent Application No. PCT/JP2020/002648, filed on 27 Jan. 2020, which application claims priority to and the benefit of JP Application No. 2019-020396, filed on 7 Feb. 2019, the disclosures of which are hereby incorporated herein by reference in their entireties.

TECHNICAL FIELD

The present invention relates to a speech recognition device, a speech recognition method, and a program.

BACKGROUND ART

With development of deep learning technology, a speech recognition modeling method termed end-to-end speech recognition which inputs a speech and outputs a text was released, and has been technically advanced. Speech recognition that has been widely used so far includes a combination of three models, i.e., an acoustic model obtained by modeling a relationship between a speech and a phonemic sequence, a pronunciation model obtained by modeling a relationship between the phonemic sequences and words, and a language model obtained by modeling a relationship between the words. By independently learning the individual models using different data, a speech recognized algorithm (device) is configured. Meanwhile, the end-to-end speech recognition allows a speech recognition algorithm (device) to be configured using only one model obtained by modeling a relationship between a speech and a text. In addition, the end-to-end speech recognition uses, for learning, only paired data sets on the speech and the text.

A description will be given of a prior-art configuration $P(W|X, \theta)$ is modeled on the assumption that an acoustic feature value sequence automatically extractable from a speech to be input to the end-to-end speech recognition is $X=(x_1, \ldots x_T)$ and a word sequence to be output from the end-to-end speech recognition is $W=(w_1, \ldots w_N)$, where $\theta$ represents a model parameter. The modeling of $P(W|X, \theta)$ is represented by the following formula, $$P(W \mid X, \theta) = \prod_{n=1}^{N} P(w_n \mid w_1, \ldots, w_{n-1}, X, \theta) \quad \text{[Formula 1]}$$

In the speech recognition algorithm (device) based on the modeling, a word sequence $\hat{W}$ in a speech recognition result when an acoustic feature value sequence $X$ is input thereto is determined based on the following formula.

$$\hat{W} = \arg\max_{W} P(W \mid X, \theta) \quad \text{[Formula 2]}$$

The model parameter $\theta$ is determined by performing learning in advance based on training data $D=(W_1, X_1), \ldots, (W_{|D|}, X_{|D|})$ including a set of pairs of a plurality of (two or more) words sequences and acoustic feature value sequences (where $|D|$ represents the number of elements in the training data D). A parameter $\hat{\theta}$ obtained by optimizing the model parameter $\theta$ with D is given by the following formula.

$$\hat{\theta} = \arg\max_{W} \prod_{m=1}^{|D|} P(W_m \mid X_m, \theta) \quad \text{[Formula 3]}$$

For detailed modeling, various methods can be used. For example, a method using a neural network is typical, and respective methods in NFL 1 and NFL 2 can be used.

CITATION LIST

Non-Patent Literature

[NFL 1] Jan Chorowski, Dzmitry Bandanau, Kyunghyun Cho, and Yoshua Bengio, "End-to-end continuous speech recognition using attention-based recurrent NN: first results," in NIPS: Workshop Deep Learning and Representation Learning Workshop, 2014.

[NPL 2] Jan Chorowski, Dzmitry Bandanau, Dmitriy Serdyuk, Kyunghyun Cho, and Yoshua Bengio, "Attention-based models for speech recognition," in Advances in Neural Information Processing Systems (NIPS), 2015, pp. 577-585.

SUMMARY OF THE INVENTION

Technical Problem

The prior-art technique described above has modeled a task of performing speech recognition of a single-utterance speech. Even in a case where speech recognition of a speech sequence including a plurality of consecutive utterances is performed, when respective speeches in the plurality of utterances are subjected to speech recognition, relations among the plurality of utterances cannot be used at all in other words, a problem arises in that, when speech recognition of a current utterance is performed, information on word sequences that have been output in response to speech inputs of previous utterances cannot be considered.

A description will be given using a specific example. For example, a case is assumed where, in a situation in which an about-10-minute lecture speech is to be subjected to speech recognition, the lecture speech is segmented every time a silent sound continues to exist for 0.5 seconds, and a total of 200 utterances are included in the lecture speech. The 200 utterances are in a continuous sequence, and it is highly possible that the consecutive utterances are conceivably utterances about information sets related to each other. However, when the prior-art technique is to be applied, it follows that each of the 200 utterances is independently subjected to speech recognition, and context information cannot be used for the speech recognition. For example, in a case where the 100th utterance is "Performance in the current fiscal year is remarkable" and the 101st utterance is "Remarkable SEI-KA (meaning each of achievement, confectionary production, and sacred fire in Japanese)", when the 100th utterance can be considered in a context, it is highly possible that the 101st utterance can be speech-recognized as "Remarkable achievement (SEI-KA in Japanese)". However, when the 100th utterance cannot be considered in a context, the 101st utterance may be erroneously recognized as "Remarkable confectionary production (SEI-KA in Japanese)" or "Remarkable sacred fire (SEI-KA in Japanese)".

For example, it is assumed that all the utterances (which are 200 utterances in the example described above) are collectively handled as one utterance having a long utterance length to solve the problem described above. In this case, since the end-to-end speech recognition algorithm (device) has such a mechanism as to convert an entire speech to a vector and handle the vector, a problem arises in that the end-to-end speech recognition algorithm (device) does not successfully operate with respect to the utterance having the long utterance length. It is unrealistic to collectively handle all the utterances as one utterance in the end-to-end speech recognition algorithm (device). Accordingly, a conventional problem lies in that end-to-end speech recognition considering a context cannot be implemented.

It is therefore an object of the present invention to provide a speech recognition device capable of implementing end-to-end speech recognition considering a context.

Means for Solving the Problem

A speech recognition device of the present invention includes a model parameter leaning unit and an uttered speech recognition unit.

The model parameter learning unit learns, based on learning data including a set of pairs of word sequences acquired in order of time series and acoustic feature value sequences corresponding thereto, a model parameter θ by using the word sequence of concern as an observation value and using the word sequence previous to the word sequence of concern, the acoustic feature value sequence corresponding to the word sequence of concern, and the model parameter θ as parameters to perform maximum likelihood estimation for a likelihood function of a probability that the observation value occurs under the parameters.

The uttered speech recognition unit repeats, in order of time series, processing of recognizing, based on recognition data including a set of the acoustic feature value sequences acquired in order of time sequence, the word sequence to be recognized. The processing of recognizing the word sequence to be recognized is performed by using the word sequence to be recognized as an observation value and using the already recognized word sequence previous to the word sequence to be recognized, the acoustic feature value sequence corresponding to the word sequence to be recognized, and the learned model parameter θ as parameters and based on a maximum likelihood criterion for the likelihood function of the probability that the observation value occurs under the parameters.

Effects of the Invention

With the speech recognition device of the present invention, it is possible to implement end-to-end speech recognition considering a context.

DESCRIPTION OF EMBODIMENTS

A detailed description will be given below of embodiments of the present invention. Note that constituent units having the same functions are given the same reference numerals, and a repeated description thereof is omitted.

First Embodiment

The following will describe a speech recognition device 1 (a minimum configuration corresponding to a configuration in a broken-line rectangle illustrated in FIG. 1) in the present embodiment. It is assumed herein that a model parameter θ is learned in advance by a device different from the speech recognition device 1.

Note that, in this description, for the convenience of document production software, "^" may be added after a character and handled such that "^" is displayed over the character. For example, when $W^{L\hat{}}$ is encountered, it is assumed that $$\hat{W}^L \quad \text{[Formula 4]}$$

is meant thereby.

<Outline of Inputs to, Output from, and Operation of Speech Recognition Device 1 (Minimum Configuration)>

Input 1: Sequence $X^1, \ldots, X^L$ of acoustic feature value sequences of L consecutive utterances Input 2: Model parameter θ (learned by another device and input to present device)

Output: Sequence $W^{1\hat{}}, \ldots, W^{L\hat{}}$ of L consecutive word sequences The speech recognition device 1 in the present embodiment receives a sequence $X^1, \ldots, X^L$ of acoustic feature value sequences of L consecutive utterances and the model parameter θ each input thereto and outputs, by probability calculation based on the model parameter θ, a sequence $W^{1\hat{}}, \ldots, W^{L\hat{}}$ of L consecutive word sequences. It is assumed herein that $X^1, \ldots, X^L$ represents a sequence of the acoustic feature value sequences that can be automatically extracted from speech sequences of the L consecutive utterances input to the end-to-end speech recognition, where $X^l$ represents the acoustic feature value sequence of the l-th utterance and is given by $X^l=(x^l_1, \ldots, x^l_{Tl})$. It is also assumed herein that $W^{1\hat{}}, \ldots, W^{L\hat{}}$ represents a sequence of word sequences to be output, where $W^{1\hat{}}$ represents the word sequence of the l-th utterance and is given by the following formula.

$$\hat{W}^l = (w^l_1, \ldots, w^l_{nl}). \quad \text{[Formula 5]}$$

As each of the acoustic feature value sequences, any feature value sequence that can be calculated from a speech can be used, and such a feature value sequence as, e.g., a mel-filter bank cepstrum coefficient or a logarithmic mel-filter bank can be used. A description of the mel filter bank cepstrum coefficient and the logarithmic mel-filter bank is omitted.

Each of the word sequences may be, e.g., a space-separated representation in the case of English or may be, e.g., a representation automatically segmented by morphological analysis or a word-segmented representation in the case of Japanese.

Figure 1:
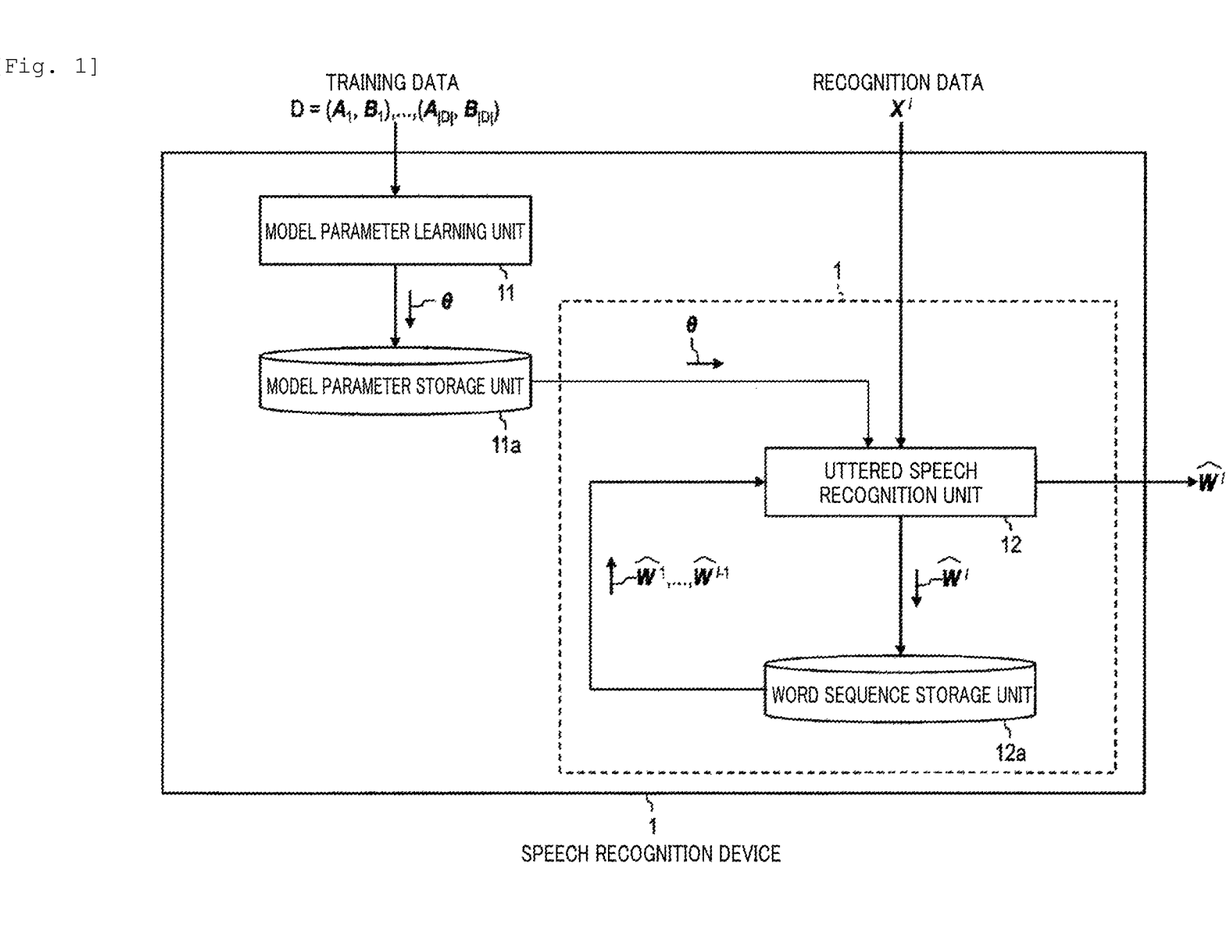
FIG. 1 is a block diagram illustrating a configuration of a speech recognition device in a first embodiment.
Figure 2:
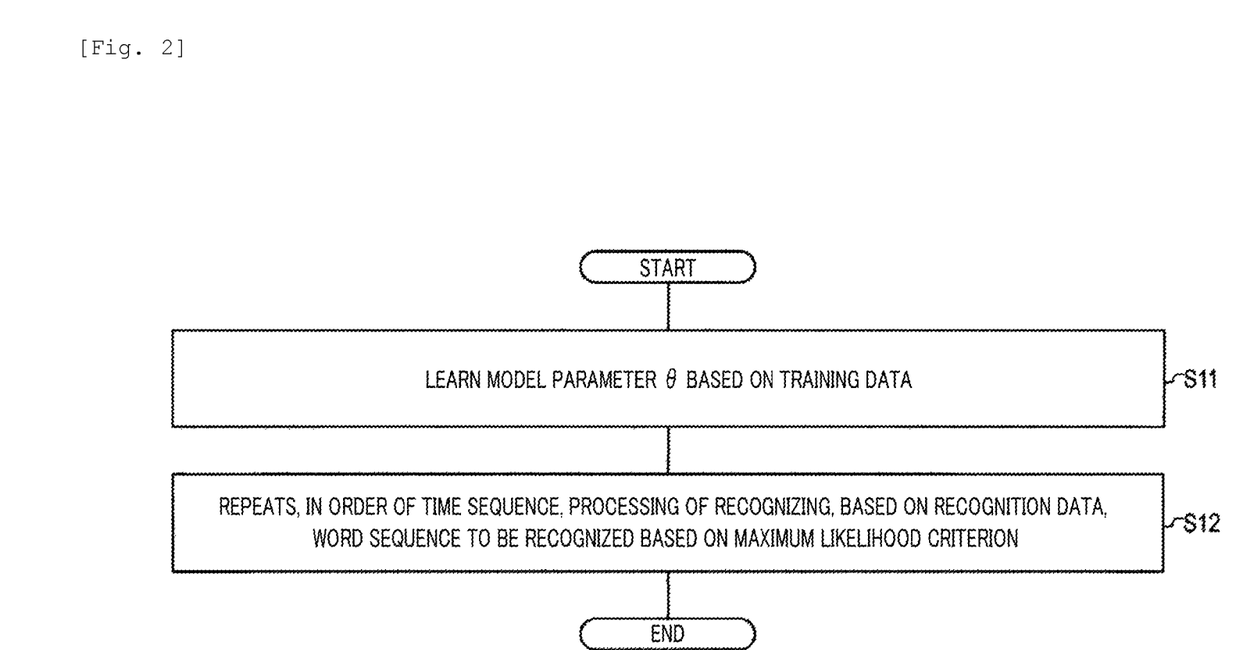
FIG. 2 is a flow chart illustrating an operation of the speech recognition device in the first embodiment.

Next, referring to FIG. 1, a description will be given of a typical configuration of the speech recognition device in the first embodiment. It is assumed herein that the model parameter θ is learned in the speech recognition device 1. As illustrated in the drawing, the speech recognition device 1 in the present embodiment includes a model parameter learning unit 11, a model parameter storage unit 11a, an uttered speech recognition unit 12, and a word sequence storage unit 12a. However, as described above, the model parameter learning unit 11 and the model parameter storage unit 11a may also be constituent features provided as separate devices. Referring to FIG. 2, an operation of each of the constituent features will be described.

<Model Parameter Learning Unit 11>

Input: Learning data $D=(A_1, B_1), \ldots, (A_{|D|}, B_{|D|})$ including set of pairs of plurality of (two or more) word sequences and acoustic feature value sequences Output: Model parameter θ

The model parameter learning unit 11 learns, based on learning data $D=(A_1, B_1), \ldots, (A_{|D|}, B_{|D|})$ including a set of pairs of a plurality of (two or more) word sequences acquired in order of time series and acoustic feature value sequences corresponding thereto, the model parameter θ by using the word sequence of concern ($W^l$ in the following formula) as an observation value and using the word sequences ($W^1, \ldots, W^{l-1}$ in the following formula) previous to the word sequence of concern, the acoustic feature value sequence ($X^l$ in the following formula) corresponding to the word sequence of concern ($W^l$ in the following formula), and the model parameter θ as parameters to perform maximum likelihood estimation for a likelihood function of a probability that the observation value ($W^l$ in the following formula) occurs under the parameters ($W^1, \ldots, W^{l-1}, X^l$, and θ in the following formula) (S11). Note that $(A_m, B_m) = \{(W^l, X^l), \ldots, (W^{Lm}, X^{Lm})\}$ is satisfied. A parameter $\hat{\theta}$ obtained by optimizing the parameter θ with D is given by the following formula.

$$\hat{\theta} = \arg\max_{\theta} \prod_{m=1}^{|D|} \prod_{l=1}^{L} P(W^l \mid W^1, \ldots, W^{l-1}, X^l, \theta) \qquad \text{[Formula 6]}$$

The learned parameter $\hat{\theta}$ is used herein as the parameter θ in the uttered speech recognition unit 12.

<Model Parameter Storage Unit 11a>

The model parameter storage unit IIa stores the learned Parameter $\hat{\theta}$.

<Uttered Speech Recognition Unit 12>

Input 1: Acoustic feature value sequence $X^l$ of l-th utterance

Input 2: Word sequences $W^{1\wedge}, \ldots, W^{l-1\wedge}$ 1st to (l−1)-th utterances already obtained as speech recognition results Input 3: Model parameter θ

Output: Word sequence $W^{l\wedge}$ of l-th utterance

The uttered speech recognition unit 12 repeats, in order of time series, processing of recognizing, based on recognition data including a set of the acoustic feature value sequences $(X^1, \ldots, X^L)$ acquired in order of time sequence, the word sequence to be recognized ($W^{1\wedge}$ in the following formula), the processing of recognizing the word sequence to be recognized being performed by using the word sequence to be recognized ($W^l$ in the following formula) as an observation value and using the already recognized word sequences ($W^{1\wedge}, \ldots, W^{l-1\wedge}$) previous to the word sequence to be recognized ($W^l$ in the following formula), the acoustic feature value sequence ($X^l$ in the following formula) corresponding to the word sequence to be recognized ($W^l$ in the following formula), and the learned model parameter θ as parameters and based on a maximum likelihood criterion for the likelihood function of the probability that the observation value ($W^l$ in the following formula) occurs under the parameters ($W^{1\wedge}, \ldots, W^{l-1\wedge}, X^l$, and θ) (S12).

Specifically, when the acoustic feature value sequence $X^l$ of the l-th utterance and the recognized word sequences $W^{1\wedge}, \ldots, W^{l-1\wedge}$ of the 1st to (l−1)-th utterances obtained as the speech recognition results are input thereto, the uttered speech recognition unit 12 performs probability calculation based the model parameter θ to obtain a posterior probability distribution for the l-th utterance given by the following formula.

$$P(W^l \mid \hat{W}^1, \ldots, \hat{W}^{l-1}, X^l, \theta) \qquad \text{[Formula 7]}$$

Then, the uttered speech recognition unit 12 determines the word sequence $W^{l\wedge}$ in the speech recognition result of the l-th speech based on the maximum likelihood criterion. In other words, the determination based on the maximum likelihood criterion is performed in accordance with the following formula.

$$\hat{W}^l = \arg\max_{W^l} P(W^l \mid \hat{W}^1, \ldots, \hat{W}^{l-1}, X^l, \theta) \qquad \text{[Formula 8]}$$

As described above, the uttered speech recognition unit 12 recursively performs Step S12 in order of time series. For example, by assuming that the word sequence $W^{l\wedge}$ in the speech recognition result of the l-th utterance is the known recognition result, the uttered speech recognition unit 12 can obtain the posterior probability distribution for the (l+1)-th utterance given by the following formula.

$$P(W^{l+1} \mid \hat{W}^1, \ldots, \hat{W}^l, X^{l+1}, \theta) \qquad \text{[Formula 9]}$$

Likewise, the uttered speech recognition unit 12 determines the word sequence $W^{l+1\wedge}$ in the speech recognition result of the (l+1)-th utterance in such a manner as shown by the following formula.

$$\hat{W}^{l+1} = \arg\max_{W^{l+1}} P(W^{l+1} \mid \hat{W}^1, \ldots, \hat{W}^l, X^{l+1}, \theta) \qquad \text{[Formula 10]}$$

Note that detailed formulation of the posterior probability distribution given by the following formula and a detailed calculation method therefor will be described later.

$$P(W^l \mid \hat{W}^1, \ldots, \hat{W}^{l-1}, X^l, \theta) \qquad \text{[Formula 11]}$$

<Word Sequence Storage Unit 12a>

The word sequence storage unit 12a stores the word sequences to be recursively used by the uttered speech recognition unit 12. For example, when the word sequence $W^{1\wedge}$ is recognized in Step S12, the word sequence storage unit 12a stores the word sequence $W^{1\wedge}$ and, when the word sequence $W^{l\wedge}$ is recognized, the word sequence storage unit 12a stores the word sequence $W^{l\wedge}$. When the word sequence $W^{L\wedge}$ is recognized, the word sequence storage unit 12a stores the word sequence $W^{L\wedge}$.

Figure 3:
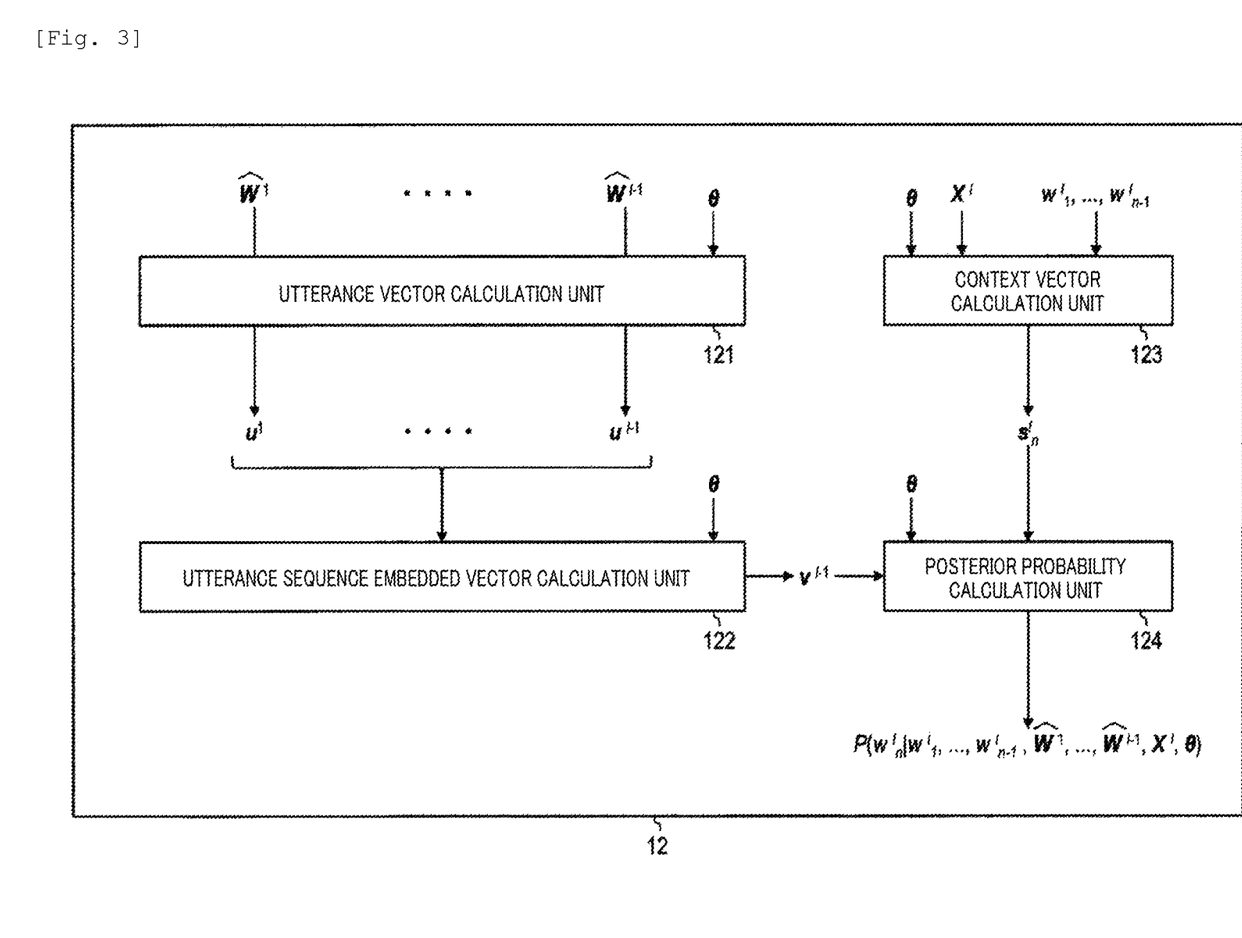
FIG. 3 is a block diagram illustrating a configuration of an uttered speech recognition unit of the speech recognition device in the first embodiment.

<Detailed Configuration of Uttered Speech Recognition Unit 12>

As illustrated in FIG. 3, the uttered speech recognition unit 12 includes an utterance vector calculation unit 121, an utterance sequence embedded vector calculation unit 122, a context vector calculation unit 123, and a posterior probability calculation unit 124.

As described above, the uttered speech recognition unit 12 calculates the posterior probability distribution given by the following formula.

$$P(W^l|\hat{W}^1, \ldots, \hat{W}^{l-1}, X^l, \theta) \quad \text{[Formula 12]}$$

Detailed formulation thereof is given by the following formula.

$$P(W^l | \hat{W}^1, \ldots, \hat{W}^{l-1}, X^l, \theta) = \prod_{n=1}^{N^l} P(w_n^l | w_1^l, \ldots, w_{n-1}^l, \hat{W}^1, \ldots, \hat{W}^{l-1}, X^l, \theta) \quad \text{[Formula 13]}$$

Note that, calculation of a probability of an n-th word of the l-th utterance given by the following formula is implemented by the utterance vector calculation unit 121, the utterance sequence embedded vector calculation unit 122, the concert vector calculation unit 123, and the posterior probability calculation unit 124 in the uttered speech recognition unit 12.

$$P(w_n^l|w_1^l, \ldots, w_{n-1}^l, \hat{W}^1, \ldots, \hat{W}^{l-1}, X^l, \theta) \quad \text{[Formula 14]}$$

Figure 4:
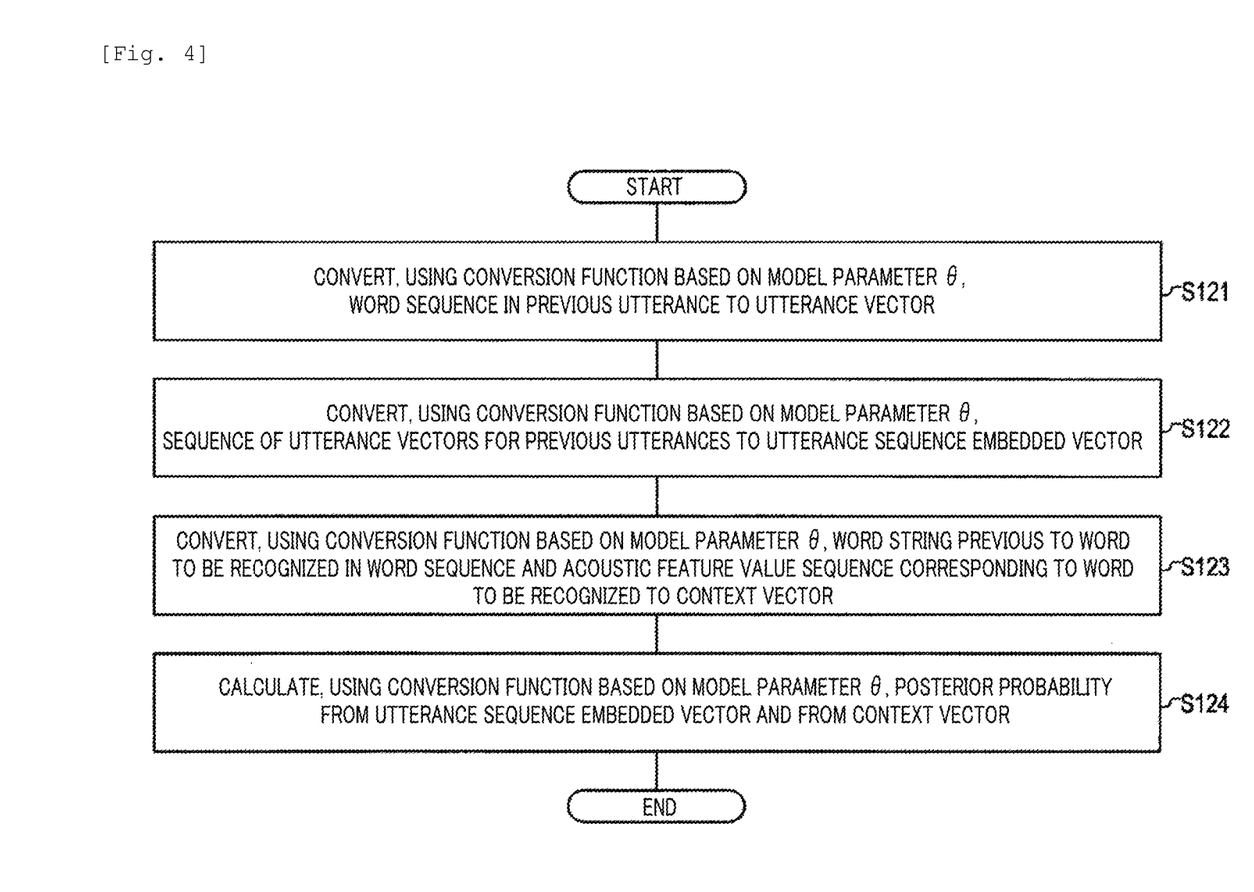
FIG. 4 is a flow chart illustrating an operation of the uttered speech recognition unit of the speech recognition device in the first embodiment.

Referring to FIG. 4, detailed processing for calculating the probability of the n-th word of the l-th utterance, which is Given by the following formula, will be described below.

$$P(w_n^l|w_1^l, \ldots, w_{n-1}^l, \hat{W}^1, \ldots, \hat{W}^{l-1}, X^l, \theta) \quad \text{[Formula 15]}$$

<Utterance Vector Calculation Unit 121>
Input 1: Word sequence $W^{l-1\wedge}$ of (l−1)-th utterance
Input 2: Model parameter $\theta$
Output: Utterance vector $u^{l-1}$ of (l−1)-th utterance The utterance vector calculation unit 121 converts, using a conversion function based on the model parameter $\theta$, the already recognized word sequence $W^{l-1\wedge}$ of the (l−1)-th utterance previous to the word sequence $W^l$ of the l-th utterance to be recognized to an utterance vector $u^{l-1}$ of the (l−1)-th utterance (S121). At this time, the word sequence $W^{l-1\wedge}$ of the (l−1)-th utterance includes one or more words. An utterance vector represents a vector in which information included in a word sequence is embedded. In the utterance vector, semantic information of an utterance required for speech recognition of a subsequent utterance is embedded. As a dimension number of the vector is increased, a larger amount of information can be embedded. The dimension number is manually determined for, e.g., a 512-dimensional vector. At this time, as the conversion function, any function can be used as long as the function converts a symbol sequence having a variable length to a single vector. For example, such a function as to configure a vector representing a frequency of a word in an utterance can be used, and a recurrent neural network, a bidirectional recurrent neural network, or the like can also be used.

Note that, when l=1 is satisfied, there is no word sequence $W^0$ to be input, and therefore a vector in which each of elements is 0.0 may be provided appropriately as an output $u^0$.

Note that Step S12 is performed on each of $W^{1\wedge}, \ldots, W^{l-1\wedge}$. Consequently, the utterance vector calculation unit 121 outputs $u^1, \ldots, u^{l-1}$.

<Utterance Sequence Embedded Vector Calculation Unit 122>
Input 1: Sequence of utterance vectors $u^1, \ldots, u^{l-1}$ for previous utterances
Input 2: Model parameter $\theta$
Output: (l−1)-th utterance sequence embedded vector $v^{l-1}$ The utterance sequence embedded vector calculation unit 122 converts, using a conversion function based on the model parameter $\theta$, a sequence of utterance vectors $u^1, \ldots, u^{l-1}$ for previous utterances to a (l−1)-th utterance sequence embedded vector $v^{l-1}$ (S122). The utterance sequence embedded vector is a single vector, and semantic information required for speech recognition of a subsequent utterance is embedded therein. As the dimension number of the vector is increased, a larger amount of information can be embedded. The dimension number is manually determined for, e.g., the 512-dimensional vector. At this time, as the conversion function, any function can be used as long as the function converts a vector sequence having a variable length to a single vector. For example, a recurrent neural network or such a function as to average individual vectors in the utterance vector sequence can be used. Note that, in the case of performing the averaging, the dimension number of the utterance sequence embedded vector depends on the respective dimension numbers of the individual vectors in the utterance vector sequence.

Note that, when l=1 is satisfied, there is no utterance vector sequence for a previous utterance sequence to be input, and therefore a vector in which each of elements is 0.0 may be provided appropriately as an output $v^0$.

<Context Vector Calculation Unit 123>
Input 1: Word string $w_1^l, \ldots, w_{n-1}^l$ previous to n-th word $w_n^l$ in word sequence $W^l$ of l-th utterance
Input 2: Acoustic feature value sequence $X^l$ of l-th utterance
Input 3: Model parameter $\theta$
Output: Context vector $s_n^l$ for n-th word of l-th utterance The context vector calculation unit 123 converts, using a conversion function based on the model parameter $\theta$, a word string $w_1^l, \ldots, w_{n-1}^l$ previous to an n-th word $w_n^l$ in the word sequence $W^l$ of the l-th utterance to be recognized and the l-th acoustic feature value sequence $X^l$ corresponding to the l-th word sequence $W^l$ to be recognized to a context vector $s_n^l$ for the n-th word $w_n^l$ in the word sequence $W^l$ of the l-th utterance (S123). The word string $w_1^l, \ldots, w_{n-1}^l$ is referred to as such to be discriminated from the word sequence in terms of meaning. In the context vector, information obtained by combining the semantical information and phonological information each required for the speech recognition of a subsequent word is embedded. At this time, as the conversion function, any function can be used as long as the function converts vector sequences having two variable lengths to a single vector. However, it is also possible to use a function which provides a recurrent neural network in each of an acoustic feature value sequence and a word sequence to add an attentional mechanism and thereby represents the acoustic feature value sequence and the word sequence as a single context vector as in, e.g., NPL 2. As a simplest conversion function, such a function as to configure a combined vector including a frequency vector for word sequences previous to the n-th word of the l-th utterance and a vector obtained by averaging the acoustic feature value sequence of the l-th utterance can be used.

<Posterior Probability Calculation Unit 124>
Input 1: (l−1)-th utterance sequence embedded vector $v^{l-1}$
Input 2: Context vector $s_n^l$ for n-th word of l-th utterance
Input 3: Model parameter $\theta$
Output: Posterior probability, for n-th word of l-th utterance $$P(w_n^l|w_1^l, \ldots, \hat{w}_{n-1}^l, \hat{W}^1, \ldots, \hat{W}^{l-1}, X^l, \theta) \quad \text{[Formula 16]}$$

The posterior probability calculation unit 124 calculates, using a conversion function based on the model parameter $\theta$, a posterior probability for the n-th word in the l-th word sequence $W^l$ given by each of the foregoing and following formulae from the (l−1)-th utterance sequence embedded vector $v^{l−1}$ obtained by converting the utterance vector sequence $u^1, \ldots, u^{l−1}$ for the word sequences including and subsequent to the word sequence immediately previous to the word sequence $W^l$ to be recognized and from the context vector $S^l_n$ for the n-th word in the l-th word sequence $W^l$ to be recognized (S124).

$$P(w_n^l | w_1^l, \ldots, \hat{w}_{n-1}^l, \hat{W}^1, \ldots, \hat{W}^{l-1}, X^l, \theta)$$ [Formula 17]

The posterior probability can be represented as a vector including individual words as elements thereof, and can represent a posterior probability distribution through vector conversion. At this time, as a conversion function, any function can be used as long as the function converts two vectors to the posterior probability distribution. For example, the conversion function can be implemented by a function which operates to perform conversion using a soft-max function for a combined vector including the two vectors. Besides, a function which can convert a total sum of elements of an output vector equivalent to the posterior probability distribution to 1.0 is applicable to the conversion function.

Into the speech recognition device 1 in the present embodiment, the modeling of the end-to-end speech recognition that handles the utterance sequence, unlike an existing end-to-end speech recognition that handles a single utterance, has been introduced. Consequently, when a speech input is represented by an utterance sequence, it is possible to implement the end-to-end speech recognition considering the context. Specifically, when speech recognition of a given utterance in the utterance sequence is to be performed, it is possible to use, as the context, information on utterances in the utterance sequence including the first and subsequent utterances immediately previous to the target utterance. For example, as described above, it is assumed that an about-10-minute lecture speech is subjected to speech recognition, and a case is assumed that, when the lecture speech is segmented every time a silent sound continues to exist for 0.5 seconds, a total of 200 utterances are included in the speech. In this case, the speech recognition device 1 in the present embodiment allows context information related to all the utterances included in the 200 consecutive utterances and previous to a given utterance to be used for the current speech recognition. For example, when the 100th utterance is to be subjected to the speech recognition, the speech recognition device 1 can use results of the speech recognition of the 1st to 99th utterances as the context.

The speech recognition device 1 in the present embodiment can enhance recognition performance of speech recognition in, e.g., a lecture speech, a phone conversation, a convention speech, or the like.

<Supplementary Note>

The device of the present invention has, e.g., as a single hardware entity, an input unit connectable to a keyboard or the like, an output unit connectable to a liquid crystal display or the like, a communication unit connectable to a communication device (e.g., a communication cable) capable of communication to an outside of the hardware entity, a CPU (Central Processing Unit which may also include a cache memory, a register, or the like), a RAM and a ROM each serving as a memory, an external storage device which is a hard disc, and a bus connecting the input unit, the output unit, the communication unit, the CPU, the RAM, the ROM, and the external storage device so as to allow data exchange therebetween. As required, a device (drive) which can perform read/write operations to a recording medium such as a CD-ROM or the like may also be provided in the hardware entity. As a physical entity including such hardware resources, a general purpose computer or the like can be listed.

In the external storage device of the hardware entity, programs required to implement the functions described above, data required to process the programs, and the like are stored. A device in which the programs, the data, and the like are to be stored is not limited to the external storage device. For example, it may also be possible to store the programs in a ROM which is a read-only storage device. Data obtained by processing the programs and the like are stored appropriately in the RAM, the external storage device, or the like.

In the hardware entity, each of the programs stored in the external storage device (or the ROM or the like) and the data required to process the program are read as necessary into the memory and interpretively executed/processed by the CPU as appropriate. As a result, the CPU implements predetermined functions (constituent features represented as such units and means as described above).

The present invention is not limited to the embodiment described above and can be modified as appropriate within a scope not departing from a gist of this invention. In addition, the processing steps described in the foregoing embodiment may be not only performed in time series in order of description, but also performed in parallel or individually depending on a processing ability of a device that performs the processing steps or as required.

As already described, when the processing function in the hardware entity (the device of the present intention) described in the foregoing embodiment is to be implemented by a computer, details of processing of the functions to be provided in the hardware entity are described by the programs. By causing the computer to execute the programs, the processing functions in the hardware entity described above are implemented on the computer.

Each of the programs describing the processing details can be recorded on a computer readable recording medium. The computer readable recording medium may be any such as, e.g., a magnetic recording device, an optical a magneto-optical recording medium, or a semiconductor memory Specifically, as, e.g., the magnetic recording device, a hard disc device, a flexible disk, a magnetic tape, or the like can be used. As the optical disc, a DVD (Digital Versatile Disc), a DVD-RAM (Random Access Memory), a CD-ROM (Compact Disc Read Only memory), a CD-R (Recordable)/RW (ReWritable), or the like can be used. As the magneto-optical recording medium, a MO (Magneto-Optical disc) or the like can be used. As the semiconductor memory, an EEP-ROM (Electronically Erasable and Programmable-Read Only Memory) or the like can be used.

This program is distributed by, e.g., selling, transferring, or lending a portable recording medium, such as a DVD or a CD-RCM, on which the program is recorded. This program may also be configured to be stored in a storage device of a server computer and transferred from the server computer to another computer via network to be distributed.

For example, a computer which executes such a program first temporarily stores the program recorded on the portable recording medium or the program transferred from the server computer in a storage device of the computer. Then, when processing is to be performed, the computer reads the program stored in a recording medium thereof and performs processing in accordance with the read program. In another mode of execution of this program, it may also be possible for the computer to read the program directly from the portable recording medium and perform processing in accordance with the program. Alternatively, it may also be possible that, every time the program is transferred from the server computer to the computer, the computer subsequently performs processing in accordance with the received program. Still alternatively, the computer may also be configured to perform the processing described above via a so-called ASP (Application Service Provider) type service which implements a processing function only with an instruction to execute the program and through acquisition of a result without involving transfer of the program from the server computer to the computer. It is assumed that the program in the present embodiment includes information (such as data which is not a direct in to the computer, but has a property of defining processing to be performed by the computer) to be provided for processing by an electronic calculator, which is equivalent to a program.

In this mode, the predetermined program is caused to be executed on the computer to configure the hardware entity. However, it may also be possible to implement at least a portion of the details of the processing as hardware.

The invention claimed is:

1. A speech recognition device comprising a processor configured to execute operations comprising:
    training, based on learning data including a set of pairs of word sequences acquired in order of time series and acoustic feature value sequences corresponding thereto, a model parameter θ by performing maximum likelihood estimation for a likelihood function, wherein the likelihood function determines a probability of an observation value occurring based on parameters by using the word sequence of concern as an observation value, and the parameters include:
        the word sequence previous to the word sequence of concern,
        the acoustic feature value sequence corresponding to the word sequence of concern, and
        the model parameter θ; and
    iteratively recognizing, based on recognition data, a word sequence time series according to a maximum likelihood criterion for the likelihood function by using the word sequence to be recognized as an observation value, wherein the likelihood function determines the probability of the observation value occurring based on parameters, the recognition data includes a set of the acoustic feature value sequences acquired in a time sequence, and the parameters include:
        a previously recognized word sequence previous to the word sequence to be recognized,
        the acoustic feature value sequence corresponding to the word sequence to be recognized, and
        the learned model parameter θ.

2. The speech recognition device according to claim 1, wherein the iteratively recognizing the word sequence further comprises:
    converting, using a conversion function based on the model parameter θ, the previously recognized word sequence previous to the word sequence to be recognized to an utterance vector, wherein the utterance vector comprises semantical information for speech recognition of a subsequent utterance;
    converting, using a conversion function based on the model parameter θ, a sequence of the utterance vectors to an utterance sequence embedded vector, wherein the utterance sequence embedded vector comprises the semantical information for the speech recognition of the subsequent utterance;
    converting, using a conversion function based on the model parameter θ, a combination of a word string in the word sequence to be recognized and the acoustic feature value sequence to a context vector, wherein the word string in the word sequence to be recognized is previous to a word of concern in the word sequence to be recognized, the acoustic feature value sequence corresponds to the word sequence to be recognized, and the context vector includes semantical information and phonological information for speech recognition of the word in the word sequence to be recognized; and
    determining, using a conversion function based on the model parameter θ, a posterior probability for the word in the word sequence to be recognized from the utterance sequence embedded vector and the context vector of the word in the word sequence to be recognized, wherein the utterance sequence embedded vector is based on converting the utterance vector sequence for the word sequences including and subsequent to the word sequence immediately previous to the word sequence to be recognized.

3. The speech recognition device according to claim 1, wherein the acoustic feature value sequence is based at least on a mel-filter bank cepstrum coefficient.

4. The speech recognition device according to claim 1, wherein the acoustic feature value sequence is based at least on a logarithmic mel-filter bank.

5. The speech recognition device according to claim 1, wherein the word sequence is based at least on a space-separated representation.

6. The speech recognition device according to claim 1, wherein the word sequence is based at least on a representation automatically segmented by morphological analysis or a word-segmented representation.

7. A speech recognition method comprising:
    training, based on learning data including a set of pairs of word sequences acquired in order of time series and acoustic feature value sequences corresponding thereto, a model parameter θ by performing maximum likelihood estimation for a likelihood function, wherein the likelihood function determines a probability of an observation value occurring based on parameters by using the word sequence of concern as an observation value, and the parameters include:
        the word sequence previous to the word sequence of concern,
        the acoustic feature value sequence corresponding to the word sequence of concern, and
        the model parameter θ; and
    iteratively recognizing, based on recognition data, a word sequence in time series according to a maximum likelihood criterion for the likelihood function by using the word sequence to be recognized as an observation value, wherein the likelihood function determines the probability of the observation value occurring based on parameters, the recognition data includes a set of the acoustic feature value sequences acquired in a time sequence, and the parameter include:
        a previously recognized word sequence previous to the word sequence to be recognized,
        the acoustic feature value sequence corresponding to the word sequence to be recognized, and
        the learned model parameter θ.

8. The speech recognition method according to claim 7, wherein the iteratively recognizing the word sequence further comprises:
converting, using a conversion function based on the model parameter θ, the previously recognized word sequence previous to the word sequence to be recognized to an utterance vector, wherein the utterance vector comprises semantical information for speech recognition of a subsequent utterance;
converting, using a conversion function based on the model parameter θ, a sequence of the utterance vectors to an utterance sequence embedded vector, wherein the utterance sequence embedded vector comprises the semantical information for the speech recognition of the subsequent utterance;
converting, using a conversion function based on the model parameter θ, a combination of a word string in the word sequence to be recognized and the acoustic feature value sequence to a context vector, wherein the word string in the word sequence to be recognized is previous to a word of concern in the word sequence to be recognized, the acoustic feature value sequence corresponds to the word sequence to be recognized, and the context vector includes semantical information and phonological information for speech recognition of the word in the word sequence to be recognized; and
determining, using a conversion function based on the model parameter θ, a posterior probability for the word in the word sequence to be recognized from the utterance sequence embedded vector and the context vector of the word in the word sequence to be recognized, wherein the utterance sequence embedded vector is based on converting the utterance vector sequence for the word sequences including and subsequent to the word sequence immediately previous to the word sequence to be recognized.

9. The speech recognition method according to claim 7, wherein the acoustic feature value sequence is based at least on a mel-filter bank cepstrum coefficient.

10. The speech recognition method according to claim 7, wherein the acoustic feature value sequence is based at least on a logarithmic mel-filter bank.

11. The speech recognition method according to claim 7, wherein the word sequence is based at least on a space-separated representation.

12. The speech recognition method according to claim 7, wherein the word sequence is based at least on a representation automatically segmented by morphological analysis or a word-segmented representation.

13. A computer-readable non-transitory recording medium storing computer-executable program instruction that when executed by a processor cause a computer system to execute operations comprising:
training, based on learning data including a set of pairs of word sequences acquired in order of time series and acoustic feature value sequences corresponding thereto, a model parameter θ by performing maximum likelihood estimation for a likelihood function, wherein the likelihood function determines a probability of an observation value occurring based on parameters by using the word sequence of concern as an observation value, and the parameters include:
the word sequence previous to the word sequence of concern,
the acoustic feature value sequence corresponding to the word sequence of concern, and
the model parameter θ; and
iteratively recognizing, based on recognition data, a word sequence in time series according to a maximum likelihood criterion for the likelihood function by using the word sequence to be recognized as an observation value, wherein the likelihood function determines the probability of the observation value occurring based on parameters, the recognition data includes a set of the acoustic feature value sequences acquired in a time sequence, and the parameters include:
a previously recognized word sequence previous to the word sequence to be recognized,
the acoustic feature value sequence corresponding to the word sequence to be recognized, and
the learned model parameter θ.

14. The computer-readable non-transitory recording medium of claim 13, wherein the iteratively recognizing the word sequence further comprises:
converting, using a conversion function based on the model parameter 8, the previously recognized word sequence previous to the word sequence to be recognized to an utterance vector, wherein the utterance vector comprises semantical information required for speech recognition of a subsequent utterance;
converting, using a conversion function based on the model parameter 8, a sequence of the utterance vectors to an utterance sequence embedded vector, wherein the utterance sequence embedded vector comprises the semantical information for the speech recognition of the subsequent utterance;
converting, using a conversion function based on the model parameter θ, a combination of a word string in the word sequence to be recognized and the acoustic feature value to a context vector, wherein the word string in the word sequence to be recognized is previous to a word of concern in the word sequence to be recognized, the acoustic feature value sequence corresponds to the word sequence to be recognized, and the context vector includes semantical information and phonological information for speech recognition of the word in the word sequence to be recognized; and
determining, using a conversion function based on the model parameter θ, a posterior probability for the word in the word sequence to be recognized from the utterance sequence embedded vector and the context vector of the word in the word sequence to be recognized, wherein the utterance sequence embedded vector is based on converting the utterance vector sequence for the word sequences including and subsequent to the word sequence immediately previous to the word sequence to be recognized.

15. The computer-readable non-transitory recording medium of claim 13, wherein the acoustic feature value sequence is based at least on a mel-filter bank cepstrum coefficient.

16. The computer-readable non-transitory recording medium of claim 13, wherein the acoustic feature value sequence is based at least on a logarithmic mel-filter bank.

17. The computer-readable non-transitory recording medium of claim 13, wherein the word sequence is based at least on a space-separated representation.

18. The computer-readable non-transitory recording medium of claim 13, wherein the word sequence is based at least on a representation automatically segmented by morphological analysis or a word-segmented representation.

* * * * *